(12) United States Patent
Shakamuri et al.

(10) Patent No.: US 10,261,936 B2
(45) Date of Patent: Apr. 16, 2019

(54) PCIE SWITCH WITH DATA AND CONTROL PATH SYSTOLIC ARRAY

(71) Applicant: EXTEN Technologies, Inc., Austin, TX (US)

(72) Inventors: Harish Kumar Shakamuri, Austin, TX (US); Ashwin Kamath, Cedar Park, TX (US); Michael Enz, Fargo, ND (US)

(73) Assignee: EXTEN Technologies, Inc., Austin, TX (US)

( * ) Notice: Subject to any disclaimer, the term of this patent is extended or adjusted under 35 U.S.C. 154(b) by 0 days.

(21) Appl. No.: 15/494,606

(22) Filed: Apr. 24, 2017

(65) Prior Publication Data

US 2018/0307648 A1 Oct. 25, 2018

(51) Int. Cl.
  *G06F 13/42* (2006.01)
  *G06F 13/36* (2006.01)
  *G06F 13/40* (2006.01)

(52) U.S. Cl.
  CPC .......... *G06F 13/4282* (2013.01); *G06F 13/36* (2013.01); *G06F 13/4022* (2013.01); *G06F 13/4265* (2013.01); *G06F 2213/0026* (2013.01)

(58) Field of Classification Search
  CPC .. G06F 13/4282; G06F 13/4265; G06F 13/36; G06F 13/4022; G06F 2213/0026
  See application file for complete search history.

(56) References Cited

U.S. PATENT DOCUMENTS

| | | | | |
|---|---|---|---|---|
| 4,493,048 A * | 1/1985 | Kung | ................. | G06F 15/8046 |
| | | | | 708/420 |
| 4,698,151 A * | 10/1987 | Ozawa | ................ | C09B 67/0096 |
| | | | | 106/31.27 |
| 4,807,183 A * | 2/1989 | Kung | ................. | G06F 13/4022 |
| | | | | 708/404 |
| 5,689,508 A * | 11/1997 | Lyles | ................. | H04L 12/5601 |
| | | | | 370/391 |
| 7,382,787 B1 * | 6/2008 | Barnes | .................... | H04L 12/66 |
| | | | | 370/401 |
| 7,450,438 B1 * | 11/2008 | Holst | ....................... | H04L 12/66 |
| | | | | 365/189.07 |
| 7,694,047 B1 * | 4/2010 | Alston | .................. | G06F 13/385 |
| | | | | 710/38 |
| 8,995,302 B1 * | 3/2015 | Brown | .................... | H04L 49/00 |
| | | | | 370/254 |
| 9,146,890 B1 * | 9/2015 | Brown | ................ | G06F 13/4022 |
| 2006/0117126 A1 * | 6/2006 | Leung, Jr. | ............... | H04L 45/00 |
| | | | | 710/306 |

(Continued)

OTHER PUBLICATIONS

"Systolic Array Processor Developments" by Keith Bromley, J.J. Symanski, J.M. Speiser, and H.J. Whitehouse, 1981.*

(Continued)

*Primary Examiner* — Jing-Yih Shyu
(74) *Attorney, Agent, or Firm* — Sprinkle IP Law Group

(57) ABSTRACT

The present subject disclosure provides a PCIe switch architecture with data and control path systolic array that can be used for real time data analysis or Artificial Intelligence (AI) learning. A systolic array is described which analyzes the TLPs received by an uplink port and processes the TLPs according to pre-programmed rules. Then the TLP is forwarded to a destination port. The reverse operation is described as well.

19 Claims, 3 Drawing Sheets

(56) References Cited

U.S. PATENT DOCUMENTS

| | | | |
|---|---|---|---|
| 2007/0195951 A1* | 8/2007 | Leung, Jr. | H04L 9/0618 |
| | | | 380/37 |
| 2014/0214911 A1* | 7/2014 | Rao | G06F 17/16 |
| | | | 708/208 |
| 2018/0082084 A1* | 3/2018 | Takahashi | G06F 21/72 |

OTHER PUBLICATIONS

"Modeling Data Flow and Control Flow for DSP System Synthesis" by va Swaaij et al. 1994.*
"FPGA Message Passing Cluster Architectures" by Eoin Creedon, Thisis to the U. of Dublin, Trinity College for degree of Doctor of Philosophy (Computer Science), May 2010.*
"Google's AI Processors (TPU) Heart Throbbing Inspiration" by Carols E. Perez, Apr. 5, 2017.*

* cited by examiner

PCIE SWITCH WITH DATA AND CONTROL PATH SYSTOLIC ARRAY

TECHNICAL FIELD

The subject disclosure relates generally to computer software and hardware design and architecture. In particular, the subject disclosure relates to PCIe switch with data and control path systolic array.

BACKGROUND

Peripheral Component Interconnect Express (PCIe) is a modern, high speed standard for a serial computer expansion bus. It operates more effectively and efficiently than other older, conventional buses in part because of its bus topology. While standard buses (such as PCI) use a shared parallel bus architecture, in which the PCI host and all devices share a common set of address, data and control lines, PCIe is based on point-to-point topology, with separate serial links connecting every device to the root complex (host). The conventional PCI clocking scheme limits the bus clock to the slowest peripheral on the bus (regardless of the devices involved in the bus transaction). In contrast, a PCIe bus link supports full-duplex communication between any two endpoints, with no inherent limitation on concurrent access across multiple endpoints.

Typically, a PCIe bus allows one device each on each endpoint of each connection. PCIe switches can create multiple endpoints out of one endpoint to allow sharing one endpoint with multiple devices.

A traditional PCIe switch can switch transaction layer packets (TLPs) from an uplink port to a downlink port based on address or requirement identifier (Req ID) only. However, as fields advance and require more robust communication, the conventional techniques for relaying information become increasingly inefficient and require improvement.

SUMMARY OF THE SUBJECT DISCLOSURE

Today's Artificial Intelligence (AI) learning and data analytics need more than just switching the PCIe TLPs to improve their performance.

The present subject disclosure provides a PCIe switch architecture with data and control path systolic array that can be used for real time data analysis or Artificial Intelligence (AI) learning.

In one exemplary embodiment, the present subject matter is a method for Peripheral Component Interconnect Express (PCIe) switching. The method includes receiving a transaction layer packet (TLP) at an uplink port; determining the nature of the TLP; routing the TLP to a systolic array; analyzing the TLP in the systolic array; and forwarding the TLP to a destination port.

In another exemplary embodiment, the present subject matter is a Peripheral Component Interconnect Express (PCIe) switch. The switch includes an uplink port for receiving a transaction layer packet (TLP); a programmable filter for determining the nature of the TLP; a systolic array for analyzing the TLP; and a destination port for receiving the TLP.

In yet another exemplary embodiment, the present subject matter is a Peripheral Component Interconnect Express (PCIe) switch. The switch includes an uplink port for receiving a transaction layer packet (TLP); a first programmable filter for determining the nature of the TLP; a systolic array for analyzing the TLP; a plurality of destination ports for receiving the TLP; and a plurality of second programmable filters associated with each of destination ports.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Particular embodiments of the present subject disclosure will now be described in greater detail with reference to the figure.

Having a systolic array in both data and control paths and ability to use the array in a programmable fashion opens up a variety of options for real time data analysis and learning.

By describing a particular exemplary embodiment, the present subject matter describes a PCIe switch with data path and control path systolic array.

Figure 1:
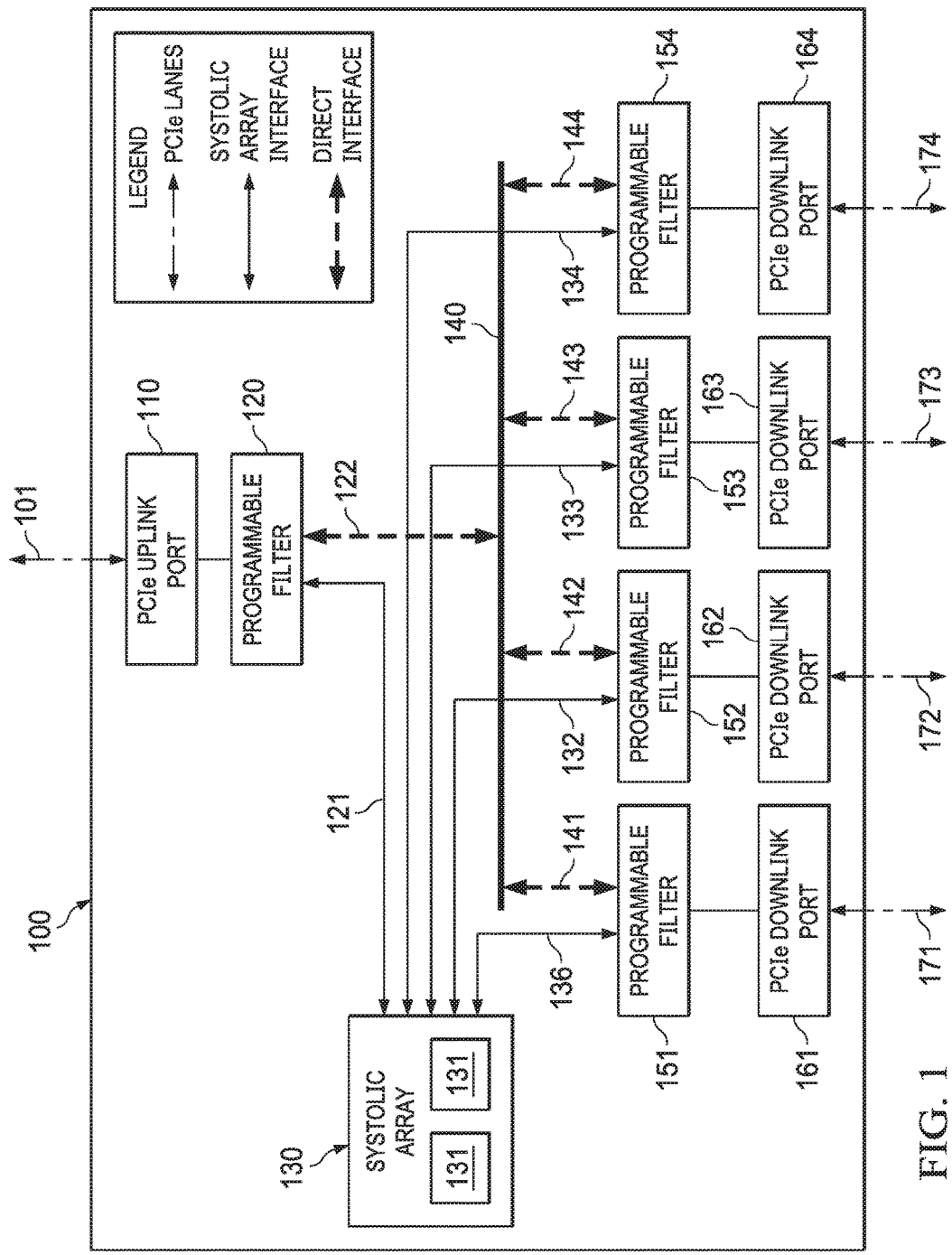
FIG. 1 illustrates a block diagram of PCIe switch with control and data path systolic array, according to an exemplary embodiment of the present subject disclosure.

FIG. 1 illustrates an exemplary diagram of a PCIe switch 100 in accordance with the present subject disclosure. The PCIe switch 100 has a PCIe lane 101 which connects to the Uplink Port 110. There are also lanes 171, 172, 173, and 174 connecting downlink port 161, 162, 163, and 164 to the outside of the PCIe switch 100. The uplink port 110 will have programmable filter 120. Also, the downlink ports 161, 162, 163, 164 will have programmable filters 151, 152, 153, and 154, respectively. The programmable filters 120, 151, 152, 153, and 154 can be programmed to have the same or different programs.

The programmable filter 120 can guide the routing of received TLPs from an uplink port 110 to the systolic array 130 through path 121. Alternatively, programmable filter 120 can guide the routing of received TLPs from an uplink port 110 through path 122 which can lead to various path options 140. Path 141 leads to destination port 161. Path 142 leads to destination port 162. Path 143 leads to destination port 163. Path 144 leads to destination port 164.

The filter 120 can provide a wide range of options for the routing of the TLPs. It can provide address based filter or Requester ID (Req ID) based filter for various type of PCIe TLPs. These include, but are not limited to, Memory Reads, Memory Writes, Completions, Configuration Reads, Configuration Writes, IO Writes, IO reads, Messages, etc. Other options are also possible and within the scope of the present disclosure.

The output of the filter 120 will also specify if just the TLP header has to be sent to the systolic array 130, or if the complete TLP has to be sent to the systolic array 130.

Programmable filter 120 can also be programmed to make systolic array 130 just a snooper, in which case TLPs will be replicated to both systolic array 130 and also to the destination ports 161, 162, 163, 164. Filter 120 can be programmed to target a particular Data Processing Unit 131 in the systolic array 130. Further, there can be an array of systolic arrays 130.

The systolic array 130 includes a homogeneous array of Data Processing Units (DPUs) 131. Systolic array 130 can be programmed to analyze just TLP headers, or both TLP headers and TLP Data. After analysis, the systolic array 130 can choose to forward the TLP to any destination port 161, 162, 163, 164. For example, path 136 leads from the systolic array 130 to downlink port 161. Path 132 leads from the systolic array 130 to downlink port 162. Path 133 leads from the systolic array 130 to downlink port 163. Path 134 leads from the systolic array 130 to downlink port 164.

Programmable filters 151, 152, 153, and 154 function similarly to programmable filter 120 but are positioned adjacent to downlink ports 161, 162, 163, and 164, respectively. These ports 151, 152, 153, 154 may be programmed to review TLPs and supply back information to the systolic array 130 and/or uplink port 110. Thus, the system described can work equally effectively providing data and information from uplink port 110 to downlink ports 161, 162, 163, and 164, as well as from downlink ports 161, 162, 163, 164 back up to uplink port 110.

There are numerous applications of the present subject disclosure, as would be appreciated by one having ordinary skill in the art. Examples include, but are not limited to, real time data analysis of the PCIe traffic, and use in Artificial Intelligence to learning algorithms helping the Graphical processing Units (GPUs). Other examples are also possible, and are within the scope of the present subject disclosure.

In the example of GPUs, the present system and method may be used to allow GPUs to communicate directly with each other. This may be accomplished by direct provisioning of GPUs, or acting as a switch between GPUs. Control processing may also be possible. Many possible applications and uses of the present subject disclosure are evident. A few such non-limiting examples will be presented herein.

Figure 2:
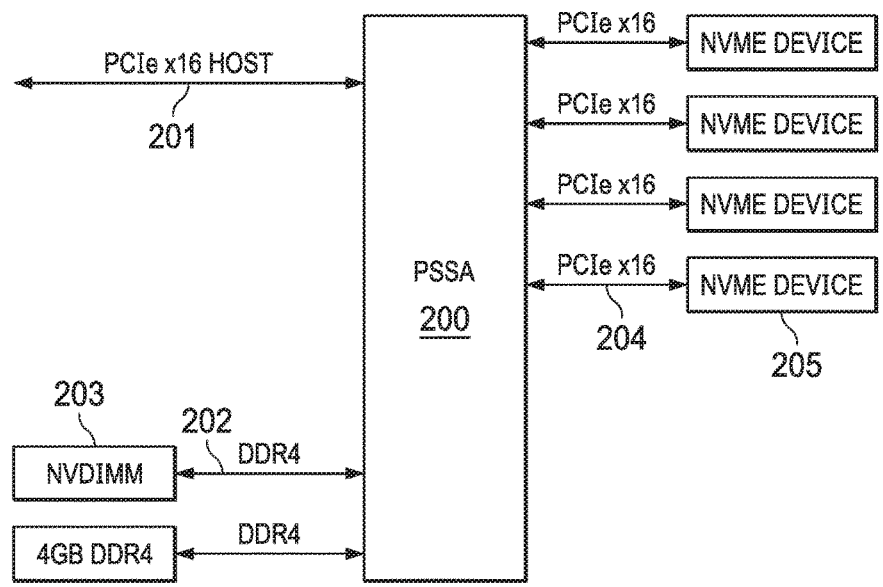
FIG. 2 illustrates an application of a PCIe switch with systolic array (PSSA) used to control redundant array of independent disks (RAID) on connected downstream non-volatile memory express (NVME) devices, according to an exemplary embodiment of the present subject disclosure.

FIG. 2 illustrates the use of a PCIe switch with systolic array (PSSA) 200 to control a redundant array of independent disks (RAID) on connected downstream non-volatile memory express (NVME) devices 205. In this example, a PCIe host 201 is connected to an uplink of PSSA 200. Further, various RAM memory paths 202 and memory storage components 203 also interact with PSSA 200. Downlink ports 204 connect with a plurality of NVME devices 205. In this example, the PSSA 200 can be used to perform RAID on the downstream NVME devices connected, without CPU intervention. Further, PSSA 200 may add NVME features implemented in software, such as encryption, non-volatile read/write cache, and controller memory buffer. As a general application, the PSSA 200 can create an emulated device by adding features to existing devices. RAID volumes extend and add features to NVME drives.

In a typical NVME RAID controller, data will be moved from host to NVME devices and vice-versa, with host posting the address for moving data, xoring/duplicating of data and reconstruction of lost data. In the present example, control software running in PSSA 200 can be used to perform both regular RAID or in a mode for moving data, xoring/duplicating of data and reconstruction of lost data. PSSA 200 can also support a hybrid mode where host 201 can directly transfer data to NVME devices 205 or can use control software for managing data transfer.

Figure 3:
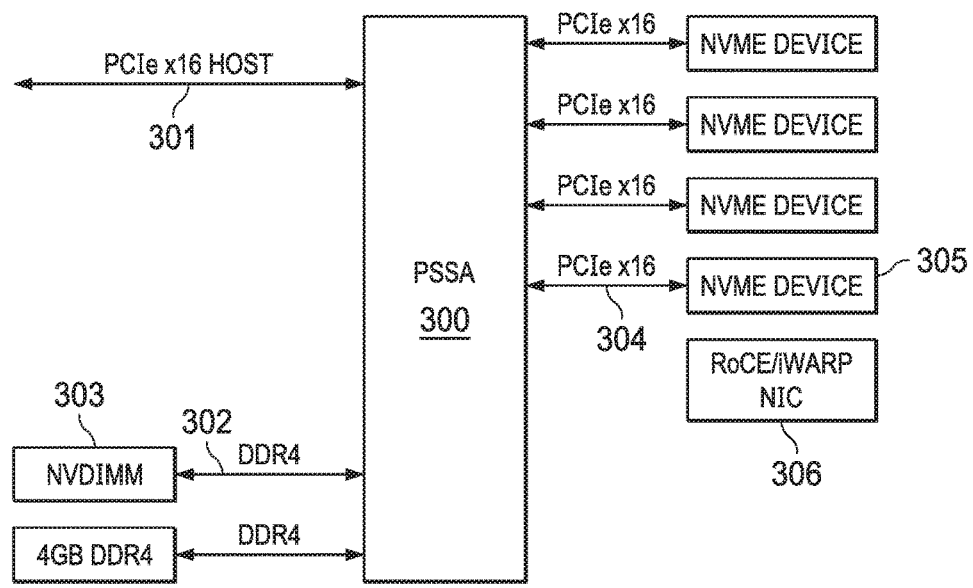
FIG. 3 illustrates an application of a PCIe switch with systolic array (PSSA) used to realize a non-volatile memory express (NVME) over Fabric, according to an exemplary embodiment of the present subject disclosure.

FIG. 3 illustrates the use of a PCIe switch with systolic array (PSSA) 300 to control a non-volatile memory express (NVME) over Fabric Bridge (NVMEoF) controller. In this example, a PCIe host 301 is connected to an uplink of PSSA 300. Further, various RAM memory paths 302 and memory storage components 303 also interact with PSSA 300. Downlink ports 304 connect with a plurality of NVME devices 305. In this example, PSSA 300 can be used to realize a NVME over Fabric initiator or target. PSSA 300 can control both NIC 306 and also NVME devices 305 and implement NVME over Fabric. As a general application, PSSA 300 can bridge any PCIE device over a network to make the remote PCIe device appear as a local device. NVME over fabrics is one example of that.

In a typical NVMEoF device, data will be transferred from NIC 306 to host 301 and then to NVME devices 305, or from NVME devices 305 to host 301 and then to NIC 306. Control software running in PSSA 300 can move data directly from NIC 306 to NVME devices 305 or vice-versa if needed thus eradicating unnecessary trips of data to host 301. For sake of completeness, as show in the figure, RoCE stands for Remote Direct Memory Access over Converged Ethernet, and iWARP stands for internet Wide Area RDMA Protocol. Both are computer networking protocols that implement RDMA for efficient data transfer.

Figure 4:
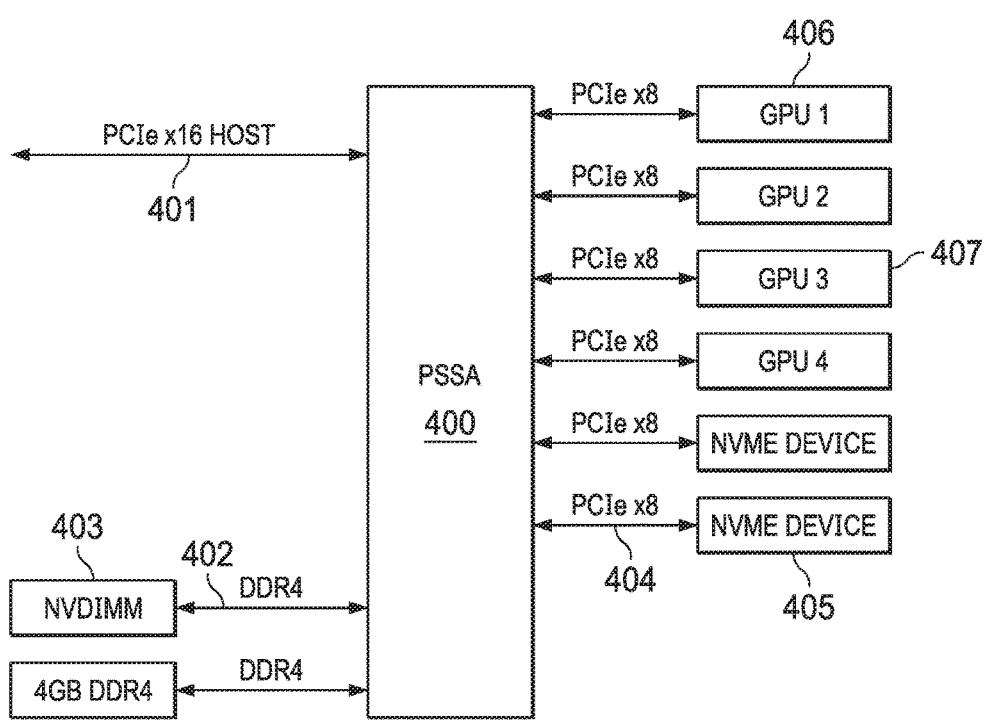
FIG. 4 illustrates an application of a PCIe switch with systolic array (PSSA) used as artificial intelligence (AI) graphics processing unit (GPU) control, according to an exemplary embodiment of the present subject disclosure.

FIG. 4 illustrates the use of a PCIe switch with systolic array (PSSA) 400 used as artificial intelligence (AI) graphics processing unit (GPU) control. In this example, a PCIe host 401 is connected to an uplink of PSSA 400. Further, various RAM memory paths 402 and memory storage components 403 also interact with PSSA 400. Downlink ports 404 connect with a plurality of NVME devices 405. In this example, PSSA 400 can provide various services when controlling GPUs performing AI deep learning. These include, but are not limited to, dynamic provisioning of GPUs, GPUs need data from storage device, systolic array can provide data without having an intervening CPU; GPU control processing can also be transferred to systolic array from CPU. PSSA 400 can route storage traffic from GPU 406 to NVME device 405 without transferring data to the host 401. As a general application, any two PCIe devices can exchange information intelligently using PSSA 400 to offload that work from a host processor 401.

In Artificial Intelligence applications, data will be moved from NVME device 405 to host 401 and then from host 401 to GPUs 406/407 or data will be moved from GPU 406 to host 401 and then to another GPU 407 or NVME device 405. Control software running in PSSA 400 can allow the regular mode of operation and also allow for data to be transferred directly from GPU 406 to GPU 407 or from NVME device 405 to GPU 406/407 or from GPU 406/407 to NVME device 405. This is a simplified example and many other possibilities and configurations are possible and within the scope of the present subject disclosure, as appreciated by one having ordinary skill in the art after considering the present disclosure.

The illustrations and examples provided herein are for explanatory purposes and are not intended to limit the scope of the appended claims. It will be recognized by those skilled in the art that changes or modifications may be made to the above described embodiment without departing from the broad inventive concepts of the subject disclosure. It is understood therefore that the subject disclosure is not limited to the particular embodiment which is described, but is intended to cover all modifications and changes within the scope and spirit of the subject disclosure.

What is claimed is:

1. A method for Peripheral Component Interconnect Express (PCIe) switching, comprising:
    receiving a transaction layer packet (TLP) at an uplink port of a PCIe switch;
    at the PCIe switch:
    determining a nature of the TLP by evaluating a parameter of the TLP at a programmable filter coupled to the uplink port;
    determining if the TLP should be routed to a systolic array at the PCIe switch based on the nature of the TLP determined by the programmable filter;
    routing the TLP to a systolic array at the PCIe switch based on a determination that the TLP should be routed to the systolic array at the PCIe switch;
    analyzing, at the PCIe switch, the TLP in the systolic array; and
    forwarding the TLP to a destination port of the PCIe switch based on the analysis of the TLP performed by the systolic array of the PCIe switch.

2. The method of claim 1, wherein only a header portion of the TLP is routed to the systolic array.

3. The method of claim 1, wherein the TLP routed to the systolic array is the TLP received at the uplink port.

4. The method of claim 1, wherein the TLP routed to the systolic array is a replica of the TLP directly forwarded to the destination port.

5. The method of claim 1, wherein the systolic array has an interface to communicate with a plurality of destination ports.

6. The method of claim 5, wherein each of the destination ports has an associated filter.

7. A Peripheral Component Interconnect Express (PCIe) switch, comprising:
    an uplink port for receiving a transaction layer packet (TLP) at the PCIe switch;
    a programmable filter coupled to the uplink port, the programmable filter for determining a nature of the TLP received at the uplink port by evaluating a parameter of the received TLP, determining if the TLP should be routed to a systolic array at the PCIe switch based on the nature of the TLP determined by the programmable filter and routing the TLP to the systolic array at the PCIe switch based on a determination that the TLP should be routed to the systolic array at the PCIe switch;
    the systolic array for analyzing the TLP at the PCIe switch and forwarding the TLP to a destination port of the PCIe switch based on the analysis of the TLP performed by the systolic array of the PCIe switch; and
    a destination port for receiving the TLP.

8. The switch of claim 7, wherein the systolic array only receives a header portion of the TLP.

9. The switch of claim 7, wherein the systolic array receives the TLP as it was received by the uplink port.

10. The switch of claim 7, wherein the programmable filter creates a replica of the TLP that it forwards to the destination port, and forwards the replica to the systolic array.

11. The switch of claim 7, wherein the destination port comprises a plurality of downlink ports.

12. The switch of claim 7, wherein the systolic array comprises an interface to communicate with a plurality of downlink ports.

13. The switch of claim 12, wherein each of the downlink ports has an associated filter.

14. The switch of claim 7, wherein the systolic array comprises a plurality of data processing units (DPUs).

15. A Peripheral Component Interconnect Express (PCIe) switch, comprising:
    an uplink port for receiving a transaction layer packet (TLP) at the PCIe switch;
    a first programmable filter coupled to the uplink port, the programmable filter for determining a nature of the TLP received at the uplink port by evaluating a parameter of the received TLP, determining if the TLP should be routed to a systolic array at the PCIe switch based on the nature of the TLP determined by the programmable filter and routing the TLP to the systolic array at the PCIe switch based on a determination that the TLP should be routed to the systolic array at the PCIe switch;
    the systolic array for analyzing the TLP at the PCIe switch, determining a first destination port of a plurality of destination ports based on the analysis of the TLP performed by the systolic array of the PCIe switch and forwarding the TLP to the determined first destination port;
    the plurality of destination ports for receiving the TLP; and
    a plurality of second programmable filters associated with each of the plurality of second programmable filter associated with a respective one of the destination ports.

16. The switch of claim 15, wherein the systolic array only receives a header portion of the TLP.

17. The switch of claim 15, wherein the systolic array receives the TLP as it was received by the uplink port.

18. The switch of claim 15, wherein the first programmable filter creates a replica of the TLP that it forwards to any of the destination ports, and forwards the replica to the systolic array.

19. The switch of claim 15, wherein the systolic array comprises a plurality of data processing units (DPUs).

* * * * *